US012625991B2

(12) United States Patent
Acharya Chandrashekar

(10) Patent No.: US 12,625,991 B2
(45) Date of Patent: May 12, 2026

(54) VIRTUAL BARRIER IN METAVERSE

(71) Applicant: INTERNATIONAL BUSINESS MACHINES CORPORATION, Armonk, NY (US)

(72) Inventor: Charan Acharya Chandrashekar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 18/525,079

(22) Filed: Nov. 30, 2023

(65) Prior Publication Data

US 2025/0181739 A1    Jun. 5, 2025

(51) Int. Cl.
G06F 21/62 (2013.01)
G06T 19/20 (2011.01)

(52) U.S. Cl.
CPC .......... G06F 21/6218 (2013.01); G06T 19/20 (2013.01); *G06F 2221/2141* (2013.01); *G06T 2210/21* (2013.01); *G06T 2219/2004* (2013.01)

(58) Field of Classification Search
None
See application file for complete search history.

(56) References Cited

U.S. PATENT DOCUMENTS 9,770,661 B2    9/2017  Priebe
11,651,108 B1    5/2023  Swanson et al.

2015/0126276 A1*    5/2015  Bhogal ................... A63F 13/35
463/29
2016/0139878 A1*    5/2016  Van Wie ............. G06F 3/04815
715/728
2021/0304515 A1*    9/2021  Hutten ................... A63F 13/75
2023/0163987 A1*    5/2023  Young ................... G06T 19/00
345/419
2023/0372830 A1*   11/2023  Gillis ................... H04L 9/3228
2024/0087234 A1*    3/2024  Monti ................... A63F 13/79
2024/0169363 A1*    5/2024  Wang ................... G06F 3/011

FOREIGN PATENT DOCUMENTS

KR            102376390            3/2022

OTHER PUBLICATIONS

Anonymous, "How to Control the Interpersonal Distances Between Avatars in the Metaverse", https://priorart.ip.com/IPCOM/000271067, Oct. 11, 2022; 4 Pages.

(Continued)

*Primary Examiner* — Philip J Chea
*Assistant Examiner* — James Ross Hollister
(74) *Attorney, Agent, or Firm* — Seed Intellectual Property Law Group LLP

(57) ABSTRACT

A system, method, and computer program product are configured to: create a secure space in a metaverse, the secure space comprising a virtual barrier; create an allow list data structure comprising a list of avatars allowed to enter the secure space; detect an avatar attempting to enter the secure space comprising detecting a virtual collision between the avatar and the virtual barrier; determine whether the avatar is on the list of avatars by checking the allow list data structure; and in response to the avatar being on the list of avatars, granting the avatar access to the secure space.

20 Claims, 7 Drawing Sheets

(56)        References Cited

OTHER PUBLICATIONS

Nexttech3D.ai, "What is the Metaverse and Spatial Mapping?" https://www.nextechar.com/blog/what-is-the-metaverse-and-spatial-mapping, May 8, 2023; 8 Pages.

Parsons, "Facebook's Metaverse gives avatars 'personal bubbles' to block virtual groping and harrassment", https://metro.co.uk/2022/02/07/facebook-metaverse-gives-avatars-personal-bubbles-to-block-groping-16060917/, Feb. 7, 2022; 28 Pages.

Wikipedia, "Collision detection", https://en.wikipedia.org/wiki/Collision_detection, Accessed Nov. 30, 2023; 9 Pages.

Souto, "Video Game Physics Tutorial—Part II: Collision Detection for Solid Objects" https://www.toptal.com/game/video-game-physics-part-ii-collision-detection-for-solid-objects, Accessed Nov. 30, 2023; 40 Pages.

James Q Quick, "JavaScript Callbacks Explained in 5 Minutes", https://www.jamesqquick.com/blog/javascript-callbacks-explained-in-5-minutes/, Aug. 9, 2022; 8 Pages.

Yalalov, "7 Global Companies Building Up and Exploring the Metaverse", https://mpost.io/7-global-companies-building-up-and-exploring-the-metaverse, Sep. 22, 2022; 18 Pages.

Castellano et al., "Beyond the hype", https://www.ibm.com/thought-leadership/institute-business-value/en-us/report/enterprise-metaverse, Jan. 9, 2023; 7 Pages.

Chijoke, "IBM Metaverse: The Future of Virtual Collaboration" https://www.dipprofit.com/discover-ibm-metaverse/, Feb. 27, 2023; 14 Pages.

Viverse, "Explore The Latest in VIVERSE" https://www.viverse.com/, Accessed Nov. 30, 2023; 9 Pages.

Marketplace, "Marketplace Volume" https://decentraland.org/marketplace/, Accessed Nov. 30, 2023; 5 Pages.

The Sand Box, "What is the Metaverse? A Guide to the Future of the Web", https://www.sandbox.game/en/blog/what-is-the-metaverse-a-guide-to-the-future-of-the-web/3362/, Accessed Nov. 30, 2023; 3 Pages.

Wikipedia, "Metaverse", https://en.wikipedia.org/wiki/Metaverse, Accessed Nov. 30, 2023; 13 Pages.

Assign User Permissions, Retrieved from: https://docs.vircadia.com/host/configure-settings/permission-settings.html, Oct. 21, 2021, 5 pages.

Vircadia, Retrieved from: https://vircadia.com/, Jun. 18, 2025, 1 Page.

* cited by examiner

Figure 1:
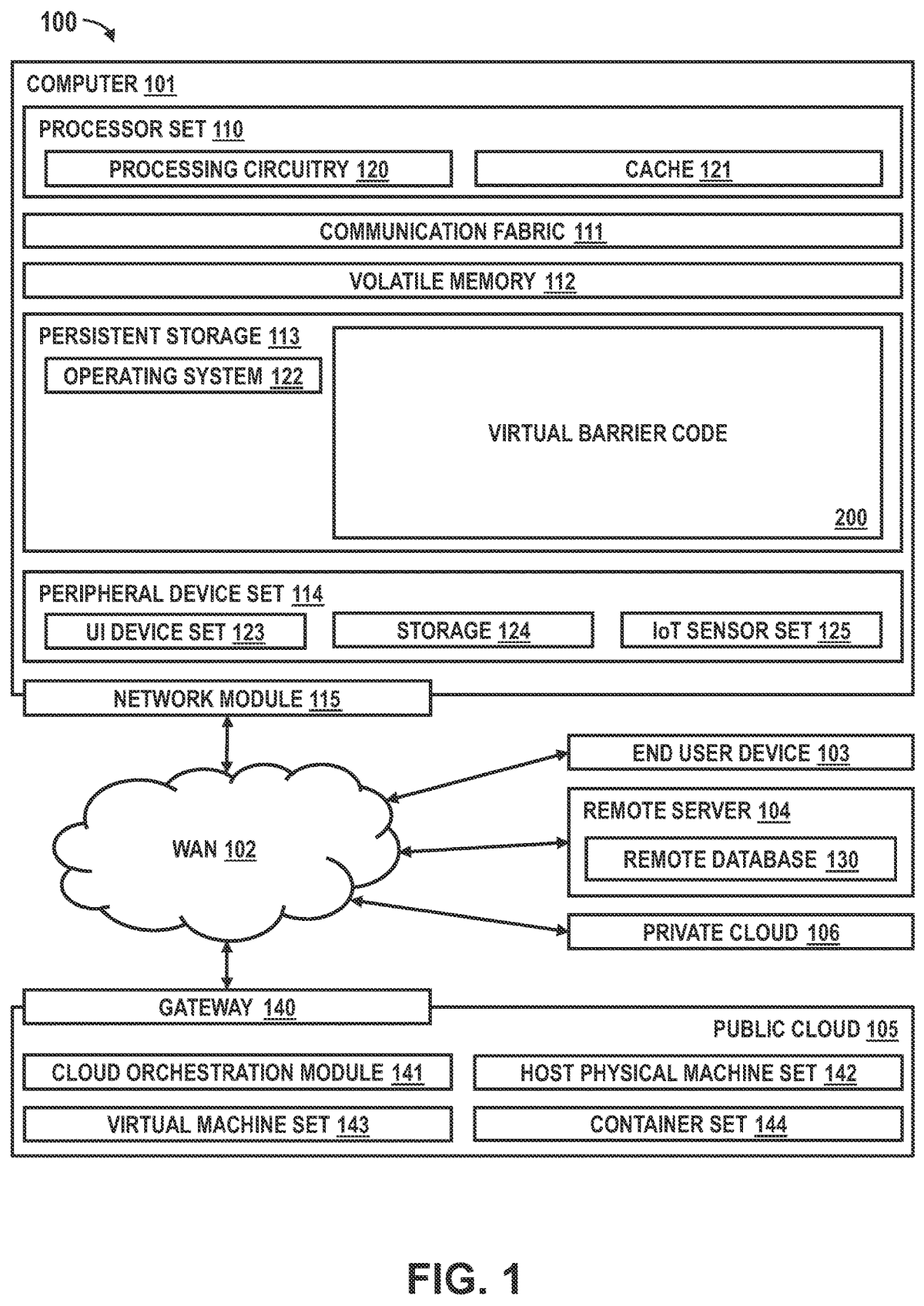

100

COMPUTER 101

PROCESSOR SET 110

PROCESSING CIRCUITRY 120 CACHE 121

COMMUNICATION FABRIC 111

VOLATILE MEMORY 112

PERSISTENT STORAGE 113

OPERATING SYSTEM 122

VIRTUAL BARRIER CODE

200

PERIPHERAL DEVICE SET 114

UI DEVICE SET 123 STORAGE 124 IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 HOST PHYSICAL MACHINE SET 142

VIRTUAL MACHINE SET 143 CONTAINER SET 144

Virtual barrier access time out or removal from allow list

602

Search data structure for avatar with entry bit set
and virtual ID

604

Remove avatar access to secure space

606

Unset the entry bit

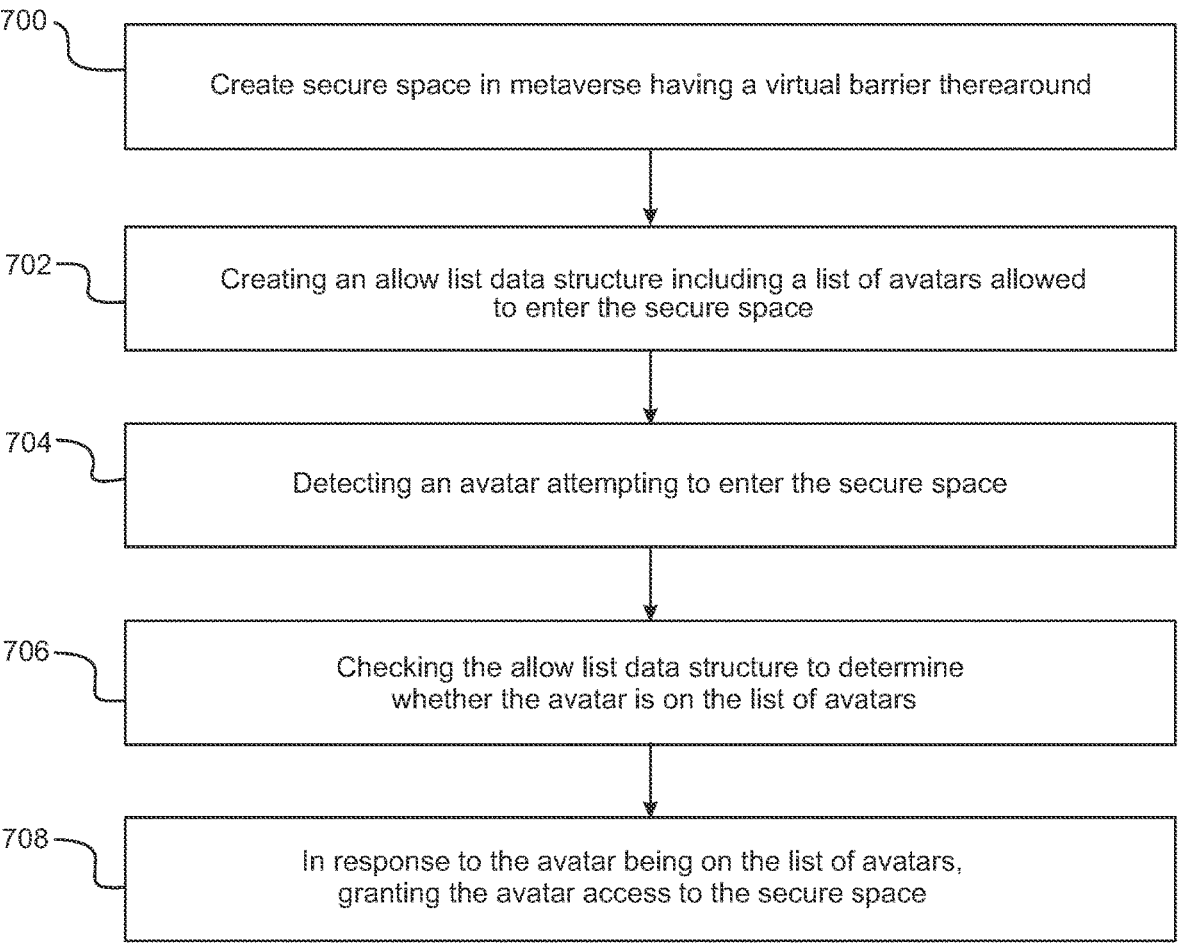

700 — Create secure space in metaverse having a virtual barrier therearound

702 — Creating an allow list data structure including a list of avatars allowed to enter the secure space 704 — Detecting an avatar attempting to enter the secure space 706 — Checking the allow list data structure to determine whether the avatar is on the list of avatars 708 — In response to the avatar being on the list of avatars, granting the avatar access to the secure space

FIG. 7

VIRTUAL BARRIER IN METAVERSE

BACKGROUND

Aspects of the present invention relate generally to virtual barriers in a metaverse and, more particularly, to methods, computer programs, and systems for creating barriers for a restricted area in the metaverse and selectively allowing avatars to enter the restricted area.

A metaverse is a virtual immersive environment (virtual world) that spans the virtual and physical world. In a metaverse, an individual can create or select a persona (also known as an avatar) that represents the individual in the metaverse. This avatar provides a transition of individual from the real world to the metaverse. The presence of the individual in the metaverse is mapped in the metaverse through his/her avatar which interacts with other entities of the virtual world from shopping, to travelling, to attending events, to visiting friends.

SUMMARY

In a first aspect of the invention, there is a computer-implemented method including: creating, by a processor set, a secure space in a metaverse, the secure space comprising a virtual barrier; creating, by the processor set, an allow list data structure comprising a list of avatars allowed to enter the secure space; detecting, by the processor set, an avatar attempting to enter the secure space comprising detecting a virtual collision between the avatar and the virtual barrier; determining, by the processor set, whether the avatar is on the list of avatars by checking the allow list data structure; and in response to the avatar being on the list of avatars, granting, by the processor set, the avatar access to the secure space.

In another aspect of the invention, there is a computer program product including one or more computer readable storage media having program instructions collectively stored on the one or more computer readable storage media. The program instructions are executable to: create a secure space in a metaverse, the secure space comprising a virtual barrier; create an allow list data structure comprising a list of avatars allowed to enter the secure space; detect an avatar attempting to enter the secure space comprising detecting a virtual collision between the avatar and the virtual barrier; determine whether the avatar is on the list of avatars by checking the allow list data structure; and in response to the avatar being on the list of avatars, granting the avatar access to the secure space.

In another aspect of the invention, there is a system including a processor set, one or more computer readable storage media, and program instructions collectively stored on the one or more computer readable storage media. The program instructions are executable to: create a secure space in a metaverse, the secure space comprising a virtual barrier; create an allow list data structure comprising a list of avatars allowed to enter the secure space; detect an avatar attempting to enter the secure space comprising detecting a virtual collision between the avatar and the virtual barrier; determine whether the avatar is on the list of avatars by checking the allow list data structure; and in response to the avatar being on the list of avatars, granting the avatar access to the secure space.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 7 shows a flowchart of an exemplary method in accordance with aspects of the present invention.

DETAILED DESCRIPTION

Figure 2:
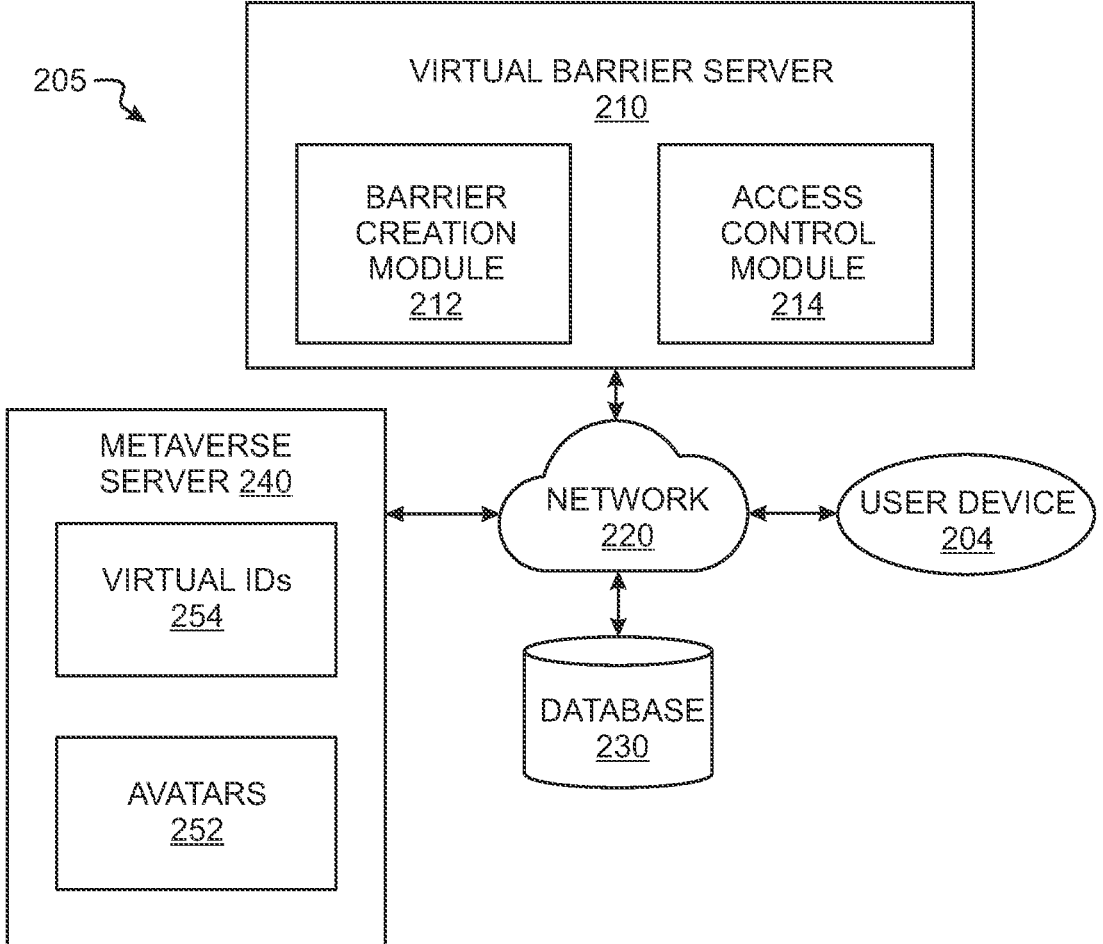
FIG. 2 shows a block diagram of an exemplary environment in accordance with aspects of the present invention.

Aspects of the present invention relate generally to virtual barriers in a metaverse and, more particularly, to methods, computer programs, and systems for creating barriers for a restricted area in the metaverse and controlling access to the restricted area by selectively allowing avatars to enter the restricted area. A metaverse is a virtual world that is accessible through the internet and is designed to mimic the real world in many ways with its own economy, social structures, and rules. The metaverse provides users, through their avatars, a rich immersive experience where they can interact with each other and with the virtual environment. Current metaverses, however, do not provide a mechanism to allow a user to selectively provide access to others in a restricted area. For example, when an event, such as a concert, is organized in the metaverse, different categories of avatars may attend the event, such as artists, organizers, very important persons (VIPs), general audience, etc. It may be desirable to restrict those different categories of avatars to designated areas. For example, the VIP would be allowed to enter premium seating areas and the artist would be allowed to enter an exclusive area where others cannot enter. In another example, an avatar may own a virtual piece of land in the metaverse and would like to allow only selected other avatars (e.g., friends and family members) to enter, such as via a modifiable virtual barrier, and to prevent unauthorized avatars from moving through a modifiable virtual barrier. Therefore, there remains a need for creating a restricted area in the metaverse and controlling access to that restricted area.

Aspects of the present invention provide systems and methods for controlling access to a restricted area in the metaverse. In embodiments, to control access, a virtual barrier enclosing a restricted area is created by a user of the metaverse. The virtual barrier is then associated with at least one data structure including a list of avatars who are allowed to enter the restricted area. When an avatar comes into contact with the virtual barrier, the system determines whether the avatar is on the list to determine whether the avatar is allowed to enter. The system allows for an intuitive way to provide avatars access into restricted areas without the need to manage or share secret codes, one-time passwords (OTP), personal identification numbers (PIN), etc. The system also allows for easy rearrangement of the restricted area during time out, e.g., when no event is held.

The virtual barrier can also include other sub-barriers within an outer barrier, e.g., rooms within a house, without impacting the aesthetics of the structure. Data saved in the data structure can be used to conduct analytics and machine learning modeling, e.g., to improve event location and layout, barrier effectiveness, tracking permitted access through barriers, and unpermitted attempts to access certain barriers.

Implementations of the invention are necessarily rooted in computer technology. For example, detecting an avatar attempting to enter a secure space, such as when attempting to pass through a virtual barrier, and granting the avatar access to the secure space, such as permitting an avatar to pass through a virtual barrier, are necessarily computer-based and cannot be performed in the human mind. Creating, accessing, and interacting with a metaverse is, by definition, performed by a computer and cannot practically be performed in the human mind (or with pen and paper) due to the complexity and massive amounts of calculations involved. Given this scale and complexity, it is simply not possible for the human mind, or for a person using pen and paper, to perform the number of calculations involved in creating, accessing, modifying, or interacting with a metaverse.

It should be understood that, to the extent implementations of the invention collect, store, or employ personal information provided by, or obtained from, individuals for example, information relating to users of the metaverse, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as virtual barrier code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment 205 includes a virtual barrier server 210 corresponding to computer 101 as in FIG. 1, user device 204 corresponding to end user device 103 of FIG. 1, and a metaverse server 240. Virtual barrier servers may include or be in operable communication with barrier creation module 212 and an access control module 214. The virtual barrier server 210, the user device 204, and the metaverse server 240 may be in communication over a network 220. In an example, the virtual barrier server 210 includes one or more instances of the computer 101 of FIG. 1, or one or more virtual machines or one or more containers or modules running on one or more instances of the computer 101 of FIG. 1. In embodiments, the virtual barrier server 240 may be running on one or more instances of the metaverse server 240. The user device 204 may include one or more instances of the EUD 103 of FIG. 1. The metaverse server 240 may include one or more virtual machines or one or more containers running on one or more instances of the remote server 104 of FIG. 1. The network 220 may include one or more networks such as the WAN 102 of FIG. 1.

In embodiments, the user device 204 is a device used by a user to access the metaverse of the metaverse server 240. The user device 204 may be, but is not limited to, a computer, a smartphone, a tablet, a headset (such as virtual reality (VR), augmented reality (AR), or extended reality (XR) headset), smart glasses, or combinations thereof.

In embodiments, the metaverse server 240 provides a platform for the metaverse. To use the metaverse, a user registers his avatar and is assigned a virtual identification (ID) associated with the avatar. The avatar is a representation of the user in the metaverse. As such, with i number of registrations (a user may register more than one avatar), the metaverse server 240 includes avatars 252 {Ai1, Ai2, . . . Ain} and virtual IDs 254 {Vi1, Vi2, . . . Vin}. Each virtual ID is assigned to an avatar. The registration process may also require other real-world identification information from the user, such as cellular phone number, name, home address, e-mail address, preference for receiving product(s) or service(s) information in the real world, etc. In the metaverse, avatars may interact with each other and the virtual environment and visit and conduct transactions in the virtual environment provided by the metaverse. The avatars may buy properties, build houses, attend events, shop, etc.

In embodiments, the virtual barrier server 210 of FIG. 2 includes a barrier creation module 212 and an access control module 214, each of which may include modules of the code of block 200 of FIG. 1. Such modules may include routines, programs, objects, components, logic, data structures, and so on, optionally stored on database 230, that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The virtual barrier server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; databases; fewer devices and/or networks; different devices and/or networks; or differently arranged devices and/or networks than illustrated in FIG. 2.

In embodiments, the barrier creation module 212 allows a user to draw a two-dimensional or three-dimensional virtual barrier defining a secure space (an avatar-restricted area) using a virtual barrier two or three-dimensional virtual marker provided through the metaverse platform or virtual barrier server and to create an allow list data structure to identify avatars (by their virtual IDs) who are allowed entry into the secure space (i.e., crossing the virtual barrier). As a non-limiting example, the virtual marker may appear as a digital asset in the form of a virtual pencil, pen, marker, or tool that, when moved as a controller or hand-gesture in the real-world, draws or outlines a barrier in the metaverse. The barrier creation module 212 may be configured for creating or defining a secure space in a metaverse via the two or three-dimensional virtual marker and defining virtual barrier as part of a virtual collision detection system. The virtual marker may use a VR device's hardware-based collision detection system to automatically generate a barrier based on proximity to real-world objects or individuals. As a non-limiting example, the barrier creation module 212 may automatically generate a barrier of approximately five "virtual meters" around an avatar in the metaverse, based on nearby real-world objects detected by the hardware-based collision detection system. The virtual marker may be configured to utilize a VR device controller or hand-detection feature to allow a user to virtually "draw" a barrier in virtual space, including width, height, or any other dimensional measurement. In this way, the secure space may be user-defined. Additionally, the barrier creation module 212 may be configured for creating an allow list data structure based on user input, such as identifying virtual avatars by avatar username, virtual IDs, or the like, comprising a list of avatars allowed to enter the secure space e.g., by creating an allow list of avatars with permission to pass through a generated barrier.

In embodiments, the access module 214 may be configured for detecting an avatar attempting to enter the secure space and checking the allow list data structure to determine whether the avatar is on the list of avatars, such as by identifying avatars 252 associated with virtual IDs 254 on the allow list stored on database 230. In response to the avatar being on the allowed list of avatars the access module 214 may grant the avatar access to the secure space i.e., allowing the avatar to pass through the virtual barrier. Allow lists may be routinely updated as needed by a user, including adding, removing, or modifying allowance rules. In embodiments, the access module 214 may be configured to allow manual modification of the allow list, including adding, removing, or modifying allowance rules for avatars 252 based on their virtual IDs 254.

In embodiments, the access control module 214 controls access of avatars into the restricted area and, if necessary, removes avatars from the restricted area. The virtual barrier acts as an invisible wall with the ability to provide access automatically and selectively to avatars in the restricted areas. When an avatar attempts to cross the virtual barrier, the access control module 214 checks that avatar's virtual ID against the allow list data structure. The avatar is allowed to move into the secure space only if its virtual ID is found on the allow list. The avatar's attempt to cross the virtual barrier in an attempt to enter the secure space may be detected, e.g., by a virtual collision detection system existing on the metaverse server 240 or a hardware-based collision detection system associated with a VR, AR, or XR headset or device. The virtual collision detection system checks for a virtual collision between the avatar and the virtual barrier, such as detecting the collision of a virtual avatar with the virtual barrier via computational geometry at the time of a collision, after a collision, or before a collision, to indicate that avatar attempted to enter the secured space. Once the avatar enters the secured space, an entry bit is set in the allow list data structure for that avatar to indicate that the avatar is inside the secure space. When the avatar leaves the secure space, the entry bit is unset for that avatar to indicate that the avatar is not in the secure space. The entry and exit data for avatars may be saved and used for statistical analysis and machine learning modeling, e.g., to improve event location and layout, barrier effectiveness, tracking permitted access through barriers, and unpermitted attempts to access certain barriers. Additionally, the access control module 214 also monitors access time limits for the avatars inside the secure space. When an access time limit is reached or an event duration has ended (access time out), any avatar having entry bits set on the allow list data structure is automatically moved out of the secure space. For example, when automatically moving an avatar out of a secure space, the system may identify a virtual location outside of the secure space, such as outside of the virtual barrier, and update the virtual geographical position of the avatar. In this way, the system may facilitate moving the avatar out of the secure space in response to the time limit expiring for the avatar. In some embodiments, when the access time limit is reached, the avatar is removed from the allow list data structure.

Figure 3:
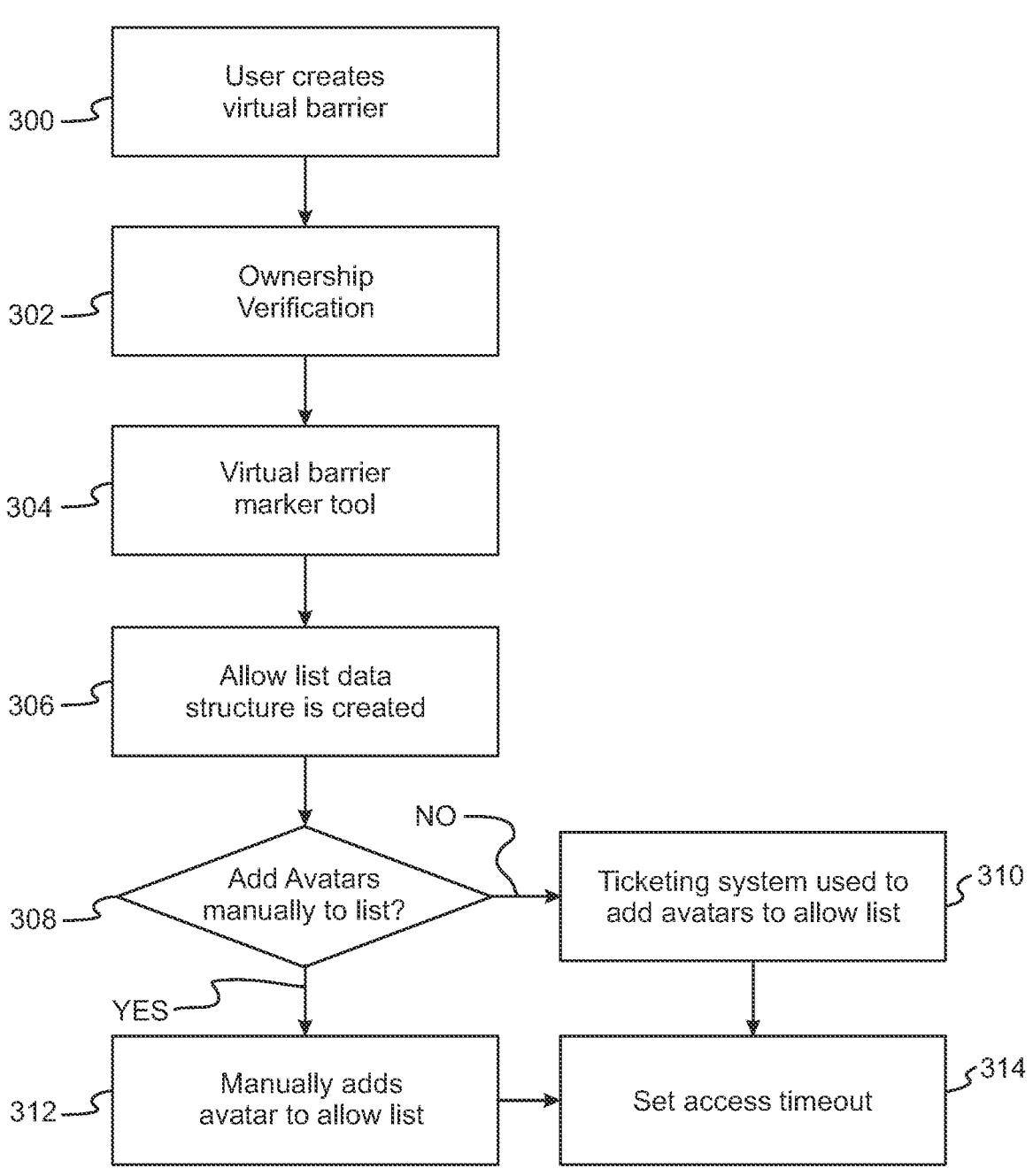
FIG. 3 shows a flowchart of an exemplary operation of the barrier creation module in accordance with aspects of the present invention.

FIG. 3 shows a flowchart describing an exemplary operation of the barrier creation module 212. In step 300, the user selects an area in the metaverse to restrict access of other avatars, such as via the virtual marker. In step 302, the barrier creation module 212 verifies ownership and that the user is authorized to operate and interact with virtual elements within the area, e.g., the user has proper ownership of a metaverse area. As an example, ownership may be verified by checking with the metaverse server 240 of FIG. 2 which maintains an ownership record of spaces on the metaverse, which may be stored in database 230 of FIG. 2. If the user is authorized to restrict access to the area, the system may create a secure space in a metaverse, the secure space comprising a virtual barrier. The user, in step 304, may draw a virtual barrier around themselves and/or within the area to define one or more restricted areas or the virtual barrier may be generated automatically based on hardware-based collision detection systems (such as proximity sensors, cameras, etc.) of a VR device. The virtual barrier may be created using the virtual marker provided by the metaverse platform. In embodiments, the virtual marker may be an existing functionality on a metaverse platform or on a VR headset or device. The restricted area may include other restricted areas therewithin such as FIG. 4.

Continuing with FIG. 3, once the virtual barrier is created, in step 306, the barrier creation module 212 creates an empty data structure on the metaverse server 240 or database 230 of FIG. 2, for entering virtual IDs for avatars who are allowed access to the restricted area associated with the virtual barrier. The data structure, referred to herein as an allow list data structure, may be implemented using, for example, unordered_map, hash_table, unordered_set, or other data structure. If more than one restricted area is created, each restricted area has an associated allow list data structure. Once the allow list data structure is created, avatars or virtual IDs identified by the user that created the secure space who are allowed to enter the restricted area are then, in step 308, added to the allow list data structure manually or automatically. For manual addition, in step 312, the user who created the secure space may add individual avatars to the allow list. In this way, an allow list data structure including a list of avatars allowed to enter the secure space may be created. The virtual IDs of the added avatars are added to the allow list data structure. Automatic addition, in step 310, may be used, e.g., by a ticketing system. In that case, every time a ticket is issued to an avatar (e.g., when the avatar buys a ticket to an event), the virtual ID of that avatar is entered into the allow list. In step 314, the barrier creation module 212 sets an access time limit for each virtual ID on the allow list and the allow list data structure may include the access time limit corresponding to each avatar.

Figure 4:
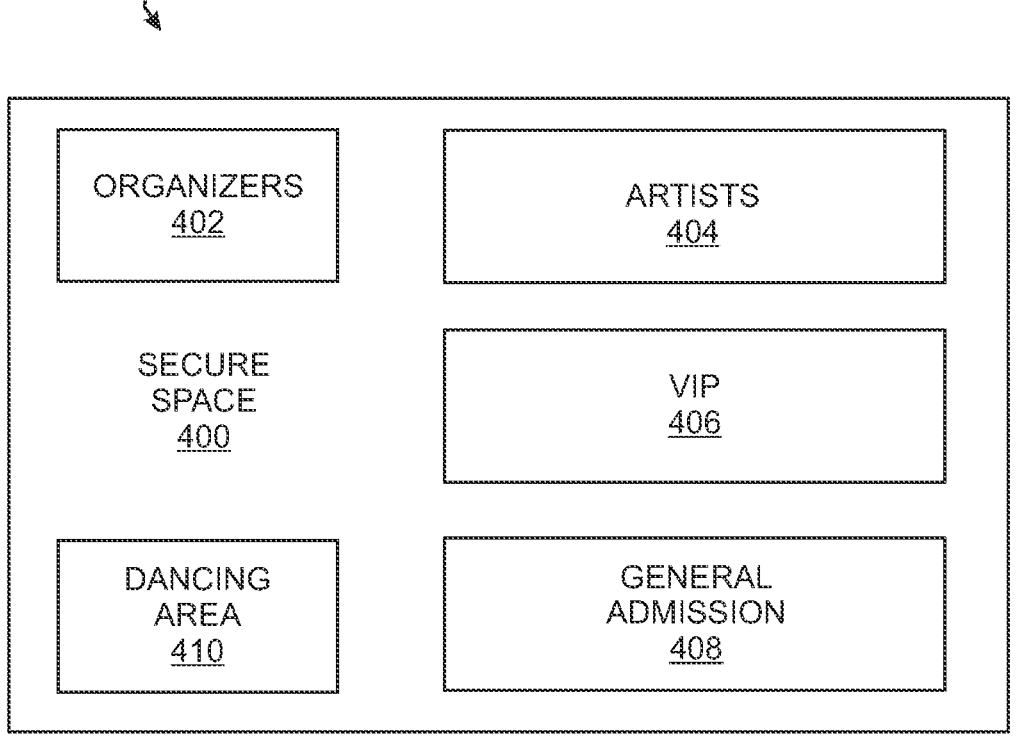
FIG. 4 shows a schematic of an exclusive event on a metaverse in accordance with aspects of the present invention.

FIG. 4 shows a schematic of a metaverse event 401 on a metaverse including a VIP space 406 within a secure space 400, defined in step 300 as depicted in FIG. 3, for a metaverse event 401. The secure space 400 also includes other secure spaces within its border which may be designated for organizers 402, artists 404, VIP 406, general admission 408, and activity area 410. The other secure spaces (for organizers 402, artists 404, VIP 406, general admission 408, and activity area 410) admit only avatars who are identified as organizers, artists, VIPs, general admission, and dancers, respectively, according to the allow list and the access control module 214, as in FIG. 2. The user may draw the virtual barrier by using the user device 204 which causes the barrier creation module 212 to create a virtual barrier around the secure space 400. In this way, the system may create at least one additional secure space within the secure space based on user input. In embodiments, the at least one additional secure space is associated with an additional allow list data structure comprising an additional list of avatars allowed to the at least one additional secure space. For example, for an event such as the one depicted in FIG. 4, avatars admitted by general admission can only access the event until the end of the event, while VIP admission may be allowed to stay longer to meet the artists and organizers. In other examples, avatars may purchase tickets for a show between 2:00-3:00 PM, while others may purchase tickets for another show between 4:00-5:00 PM. Once the access limit is reached, the avatar is removed from the allow list and/or removed from the restricted area.

Figure 5:
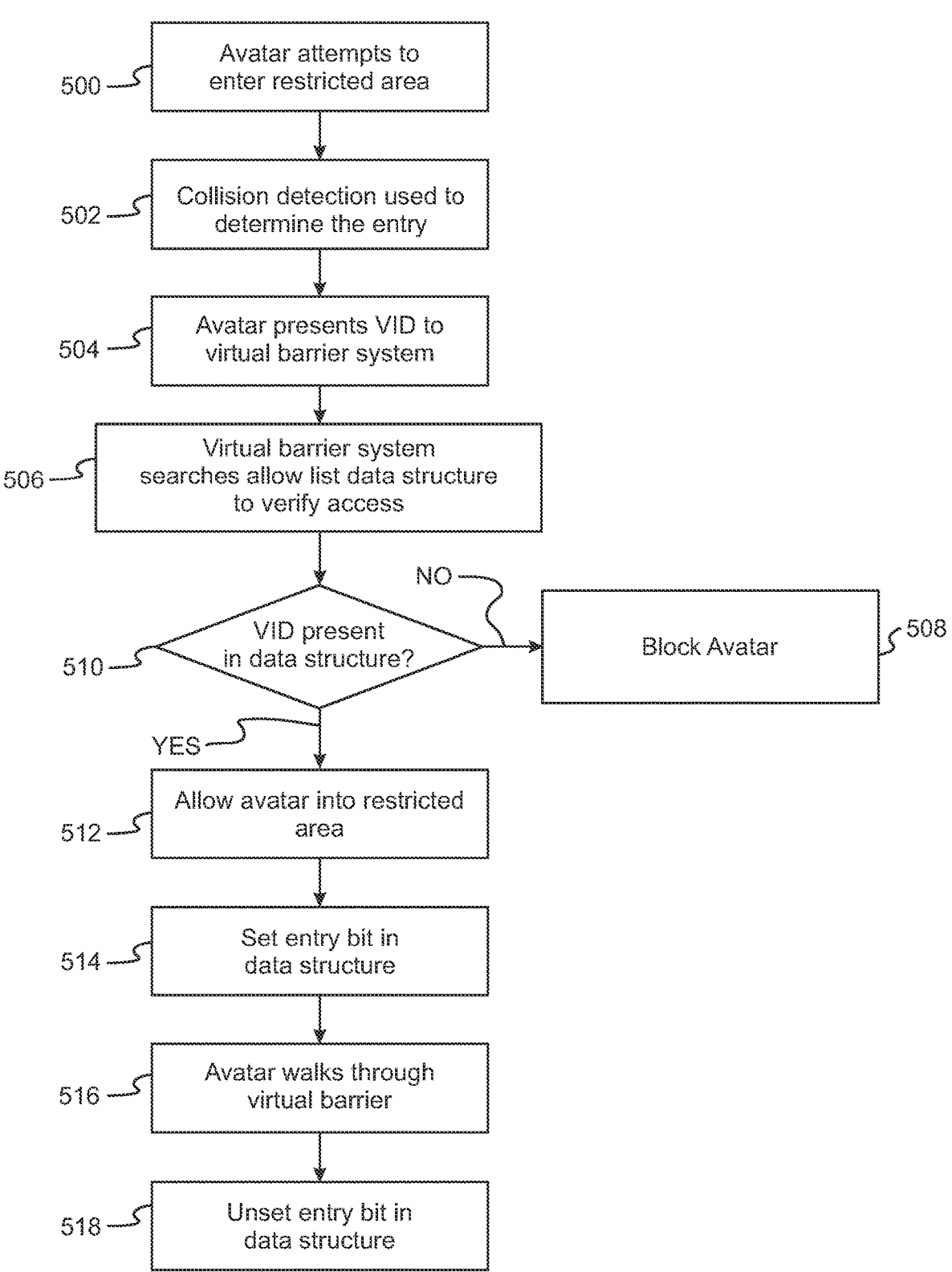
FIG. 5 shows a flowchart of an exemplary operation of the access control module to control entry into the secure space in accordance with aspects of the present invention.

FIG. 5 shows a flowchart describing an exemplary operation of the access control module 214, as in FIG. 2, to control entry into the secure space defined by the barrier. In step 500, the avatar attempts to enter the secure space. In step 502, the virtual collision detection system detects a virtual collision between the avatar and the virtual barrier, such as detecting an avatar attempting to enter the secure space including detecting a collision between the avatar and the virtual barrier, which, in step 504, triggers the access control module 214 to obtain the avatar's virtual ID (VID, depicted as 254 in FIG. 2) from the metaverse server 240 or database 230. In step 506, the access control module 214 searches the allow list data structure for the avatar's virtual ID, in step 510, to determine whether the avatar's virtual ID is present in the allow list data structure. If the avatar's virtual ID is not present in the allow list data structure, in step 508, the system blocks or denies entry to the secure space. If the avatar's virtual ID is present in the allow list data structure, in step 512, the system allows access of the avatar into the secure space. Once the avatar enters the secure space, in step 514, the system sets the entry bit corresponding to the avatar in the allow list data structure including setting an entry bit in the allow list data structure corresponding to the avatar in response to the avatar being granted access to the secure space. In step 516, an avatar may pass through the virtual barrier. In step 518, the system unsets the entry bit in the allow list data structure corresponding to the avatar in response to the avatar exiting the secure space.

Figure 6:
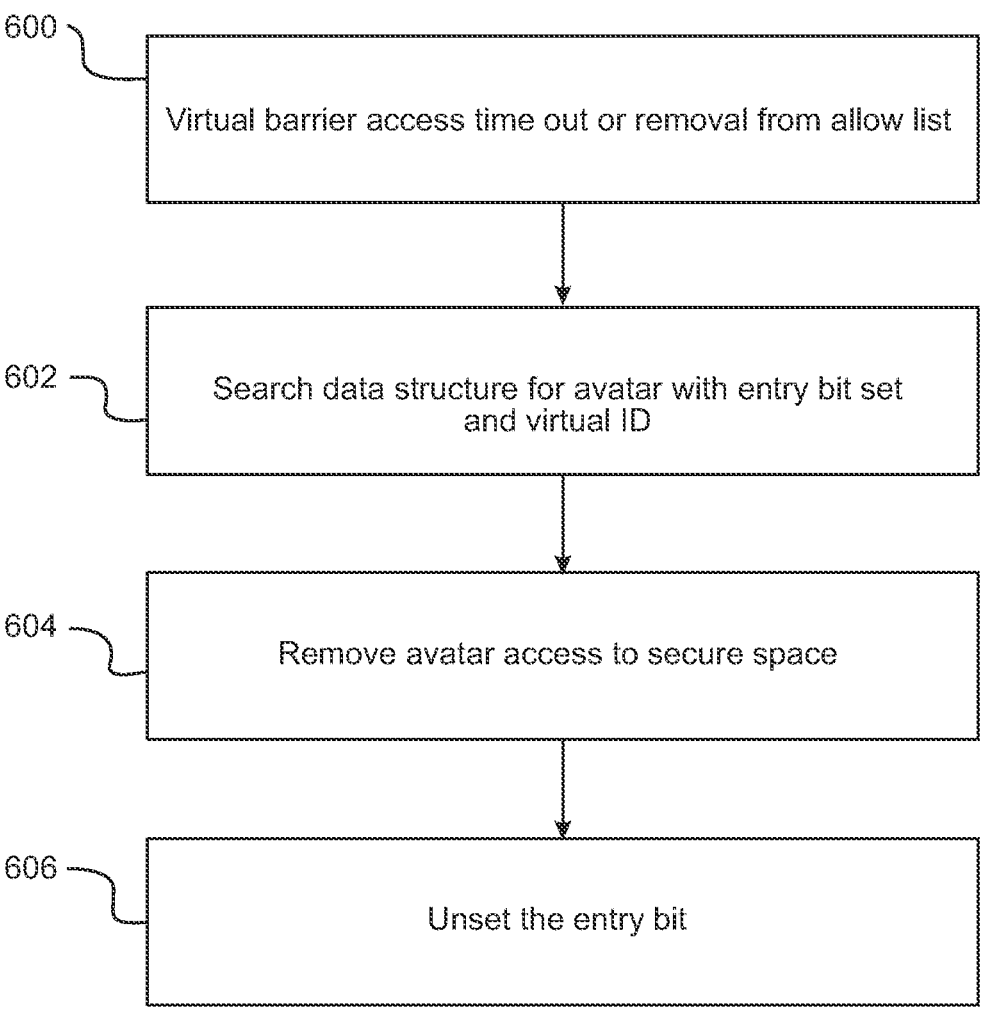
FIG. 6 shows a flowchart of an exemplary operation of the access control module to remove avatars in accordance with aspects of the present invention.

FIG. 6 shows a flowchart describing an exemplary operation of the access control module 214 to remove avatars from the secure space when time expires. In embodiments, as mentioned above, the allow list data structure may include an access time limit for each virtual ID. In embodiments, the allow list data structure may include an access time limit corresponding to each avatar. The access time limit may vary between the different avatars accessing the secure space. In some instances, avatars may have an infinite access time limit or no access time limit. In step 600, access time out (when the access time limit is reached) triggers or the system removes a virtual ID from the allow list. In step 602, the system searches the allow list data structure for avatars having expired access time limits or determines that a virtual ID is not on the list of avatars allowed to enter the secure space, and entry bits set (indicating the avatar is still in the secured space). In step 604, the system removes avatars from the secure space. Additionally, in step 606, the system unsets the entry bit for those avatars.

FIG. 7 shows a flowchart of an exemplary method in accordance with aspects of the present invention. At step 700, the system creates a secure space in the metaverse. The secure space has a virtual barrier around it. In embodiments, and as described with respect to FIG. 2, the barrier creation module 212 performs this step.

At step 702, the system creates an allow list data structure. The allow list data structure includes a list of avatars allowed to enter the secure space that is created at step 700. In embodiments, and as described with respect to FIG. 2, the barrier creation module 212 performs this step.

At step 704, the system detects an avatar attempting to enter the secure space. In embodiments, and as described with respect to FIG. 2, the access control module 214 performs this step.

At step 706, the system checks the allow list data structure to determine whether the avatar is on the list of avatars allowed to enter the secure space. In embodiments, and as described with respect to FIG. 2, the access control module 214 performs this step.

At step 708, in response to the avatar being on the list of avatars, the system grants access to the secure space to the avatar is granted access. In embodiments, and as described with respect to FIG. 2, the access control module 214 performs this step.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can include one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
creating, by a processor set, a user-defined secure space in a metaverse based on an input from a multidimensional virtual marker by a user, the secure space comprising a virtual barrier;
creating, by the processor set, an allow list data structure comprising a list of avatars allowed to enter the secure space, wherein each avatar is assigned a virtual identification during a user registration process that requires real-world identification from the user;
detecting, by the processor set, an avatar attempting to enter the secure space comprising detecting a virtual collision between the avatar and the virtual barrier;
determining, by the processor set, whether the avatar is on the list of avatars by searching the allow list data structure for the virtual identification of the avatar; and
in response to the virtual identification of the avatar being on the allow list data structure, granting, by the processor set, the avatar access to the secure space.

2. The computer-implemented method of claim 1, further comprising verifying ownership of the secure space.

3. The computer-implemented method of claim 1, further comprising creating at least one additional secure space within the secure space based on user input.

4. The computer-implemented method of claim 3, wherein the at least one additional secure space is associated with an additional allow list data structure comprising an additional list of avatars allowed to the at least one additional secure space.

5. The computer-implemented method of claim 1, wherein detecting the avatar attempting to enter the secure space comprises detecting a virtual collision between the avatar and the virtual barrier via computational geometry at the time of the virtual collision.

6. The computer-implemented method of claim 1, further comprising setting an entry bit in the allow list data structure corresponding to the avatar in response to the avatar being granted access to the secure space.

7. The computer-implemented method of claim 6, further comprising unsetting the entry bit in the allow list data structure corresponding to the avatar in response to the avatar exiting the secure space.

8. The computer-implemented method of claim 1, wherein the allow list data structure further comprises an access time limit corresponding to each avatar.

9. The computer-implemented method of claim 8, further comprising moving the avatar out of the secure space in response to the access time limit expiring corresponding to the avatar.

10. A computer program product comprising one or more computer readable storage media having program instructions collectively stored on the one or more computer readable storage media, the program instructions executable to:
create a user-defined secure space in a metaverse based on an input from a multidimensional virtual marker by a user, the secure space comprising a virtual barrier;
create an allow list data structure comprising a list of avatars allowed to enter the secure space, wherein each avatar is assigned a virtual identification during a user registration process that requires real-world identification from the user;
detect an avatar attempting to enter the secure space comprising detecting a virtual collision between the avatar and the virtual barrier;
determine whether the avatar is on the list of avatars by searching the allow list data structure for the virtual identification of the avatar; and
in response to the virtual identification of the avatar being on the allow list data structure, grant the avatar access to the secure space.

11. The computer program product of claim 10, wherein the program instructions are executable to:
verify ownership of the secure space; and
analyze entry and exit data associated with the secure space for barrier effectiveness, tracking permitted access through barriers, and unpermitted attempts to access certain barriers.

12. The computer program product of claim 10, wherein the program instructions are executable to:
create at least one additional secure space within the secure space based on user input.

13. The computer program product of claim 12, wherein the at least one additional secure space is associated with an additional allow list data structure comprising an additional list of avatars allowed to the at least one additional secure space.

14. The computer program product of claim 10, wherein detecting an avatar attempting to enter the secure space comprises detecting a virtual collision between the avatar and the virtual barrier via computational geometry at the time of the virtual collision.

15. The computer program product of claim 10, wherein the program instructions are executable to:
set an entry bit in the allow list data structure corresponding to the avatar in response to the avatar being granted access to the secure space.

16. The computer program product of claim 15, wherein the program instructions are executable to:
unset the entry bit in the allow list data structure corresponding to the avatar in response to the avatar exiting the secure space.

17. The computer program product of claim 10, wherein the allow list data structure further comprises an access time limit corresponding to each avatar.

18. The computer program product of claim 17, wherein the program instructions are executable to:

move the avatar out of the secure space and remove the avatar from the allow list data structure in response to the access time limit expiring corresponding to the avatar.

19. A system comprising:

a processor set, one or more computer readable storage media, and program instructions collectively stored on the one or more computer readable storage media, the program instructions executable to:

create a user-defined secure space in a metaverse based on an input from a multidimensional virtual marker by a user, the input comprising the user moving the multi-dimensional virtual marker in the metaverse utilizing a controller or hand-gesture in the real-world to draw a two-dimensional or three-dimensional barrier that defines the secure space in the metaverse, the secure space comprising a virtual barrier;

create an allow list data structure comprising a list of avatars allowed to enter the secure space, wherein each avatar is assigned a virtual identification during a user registration process that requires real-world identification from the user;

detect an avatar attempting to enter the secure space comprising detecting a virtual collision between the avatar and the virtual barrier;

determine whether the avatar is on the list of avatars by searching the allow list data structure for the virtual identification of the avatar; and in response to the virtual identification of the avatar being on the allow list data structure, granting the avatar access to the secure space.

20. The system of claim 19, wherein the secure space is user-defined.

* * * * *